(12) United States Patent
Sofronie et al.

(10) Patent No.: US 8,047,834 B2
(45) Date of Patent: Nov. 1, 2011

(54) SEGMENTED PRESSWARE DIE SET WITH ANTI-TWIST GUIDE KEYS

(75) Inventors: Mircea T. Sofronie, Easton, PA (US); Albert D. Johns, Myrtle Beach, SC (US); Mark B. Littlejohn, Appleton, WI (US); Kenneth J. Zirbel, Kaukauna, WI (US); Luke G. Stumpf, Kaukauna, WI (US); Gary J. Reif, Kaukauna, WI (US)

(73) Assignee: Dixie Consumer Products LLC, Atlanta, GA (US)

( * ) Notice: Subject to any disclaimer, the term of this patent is extended or adjusted under 35 U.S.C. 154(b) by 219 days.

(21) Appl. No.: 12/431,025

(22) Filed: Apr. 28, 2009

(65) Prior Publication Data

US 2009/0232926 A1    Sep. 17, 2009

Related U.S. Application Data

(63) Continuation-in-part of application No. 11/465,694, filed on Aug. 18, 2006.

(60) Provisional application No. 61/125,698, filed on Apr. 28, 2008, provisional application No. 60/709,649, filed on Aug. 19, 2005.

(51) Int. Cl.
*B29C 43/04* (2006.01)

(52) U.S. Cl. ............... 425/394; 425/403.1; 425/411; 425/422; 425/443; 264/334

(58) Field of Classification Search ............... 425/409, 425/403.2, 410, 422, 444, 443, 394, 403.1, 425/411; 264/320, 322, 334
See application file for complete search history.

(56) References Cited

U.S. PATENT DOCUMENTS

| | | | |
|---|---|---|---|
| 1,793,089 A | 2/1931 | Heyes | |
| 2,332,937 A | 10/1943 | Schmidberger | |
| 2,595,046 A | 4/1952 | Amberg | |
| 2,832,522 A | 4/1958 | Schlanger | |
| 3,305,434 A | 2/1967 | Bernier et al. | |
| 3,724,802 A * | 4/1973 | Veneria | 425/443 |
| 3,824,058 A | 7/1974 | Axer et al. | |
| 4,150,936 A | 4/1979 | Shioi et al. | |
| 4,242,293 A | 12/1980 | Dowd | |
| 4,588,539 A | 5/1986 | Rossi et al. | |

(Continued)

OTHER PUBLICATIONS

W.A. Gloger, Pigments (Inorganic), Kirk-Othmer, Encyclopedia of Chemical Technology, Third Edition, pp. 798, 799, 815 and 831-836, vol. 17, John Wiley & Sons, New York, USA.

*Primary Examiner* — Richard Crispino
*Assistant Examiner* — Thukhanh Nguyen
(74) *Attorney, Agent, or Firm* — William W. Letson

(57) ABSTRACT

A heated, segmented pressware die set for making pressware containers from a paperboard blank includes a plurality of guide keys mounted between at least one of an inner member of a punch or die and an outer ring which reciprocates independently. Each guide key extends in an outward direction from the central axis of the die set. The guide keys are positioned, configured and dimensioned to engage the outer ring in order to limit rotation of the outer ring with respect to the inner member of the punch or die. In a preferred construction, the guide keys have radially extending planar surfaces which cooperate with guide channels having like surfaces such that clearances necessary to accommodate thermal expansion are reduced, greatly increasing durability of the tool.

20 Claims, 11 Drawing Sheets

U.S. PATENT DOCUMENTS

| | | |
|---|---|---|
| 4,606,496 A | 8/1986 | Marx et al. |
| 4,609,140 A | 9/1986 | Van Handel et al. |
| 4,721,499 A | 1/1988 | Marx et al. |
| 4,721,500 A | 1/1988 | Van Handel et al. |
| 4,755,128 A | 7/1988 | Alexander et al. |
| 4,781,566 A | 11/1988 | Rossi et al. |
| 4,832,676 A | 5/1989 | Johns et al. |
| 5,088,640 A | 2/1992 | Littlejohn et al. |
| 5,129,874 A | 7/1992 | Hayes, III et al. |
| 5,203,491 A | 4/1993 | Marx et al. |
| 5,249,946 A | 10/1993 | Marx |
| 5,326,020 A | 7/1994 | Cheshire |
| 5,364,583 A | 11/1994 | Hayashi |
| 5,390,575 A * | 2/1995 | Saito ............................ 83/140 |
| 5,693,346 A | 12/1997 | Dull et al. |
| 5,773,043 A * | 6/1998 | Hunter ........................ 425/464 |
| 5,938,112 A | 8/1999 | Sandstrom |
| 6,139,307 A | 10/2000 | Plourde et al. |
| 6,261,082 B1 | 7/2001 | Han |
| 6,284,101 B1 | 9/2001 | Marx |
| 6,474,497 B1 | 11/2002 | Littlejohn et al. |
| 6,527,687 B1 | 3/2003 | Fortney et al. |
| 6,585,506 B1 | 7/2003 | Johns et al. |
| 6,589,043 B1 | 7/2003 | Johns et al. |
| 6,592,357 B1 | 7/2003 | Johns et al. |
| 6,715,630 B2 | 4/2004 | Littlejohn et al. |
| 6,733,852 B2 | 5/2004 | Littlejohn et al. |
| 6,783,720 B2 | 8/2004 | Johns et al. |
| 6,893,693 B2 | 5/2005 | Swoboda et al. |
| 6,908,296 B2 | 6/2005 | Johns et al. |
| 6,932,753 B1 | 8/2005 | Smith et al. |
| 7,048,176 B2 | 5/2006 | Littlejohn et al. |
| 7,337,943 B2 | 3/2008 | Johns et al. |
| 7,419,462 B1 | 9/2008 | Zelinski |
| D625,201 S | 10/2010 | Wichmann |
| 2005/0192171 A1 | 9/2005 | Grischenko et al. |
| 2006/0208054 A1 | 9/2006 | Littlejohn et al. |
| 2007/0042072 A1 | 2/2007 | Johns et al. |
| 2008/0242525 A9 | 10/2008 | Johns et al. |
| 2009/0114659 A1 | 5/2009 | Littlejohn et al. |

* cited by examiner

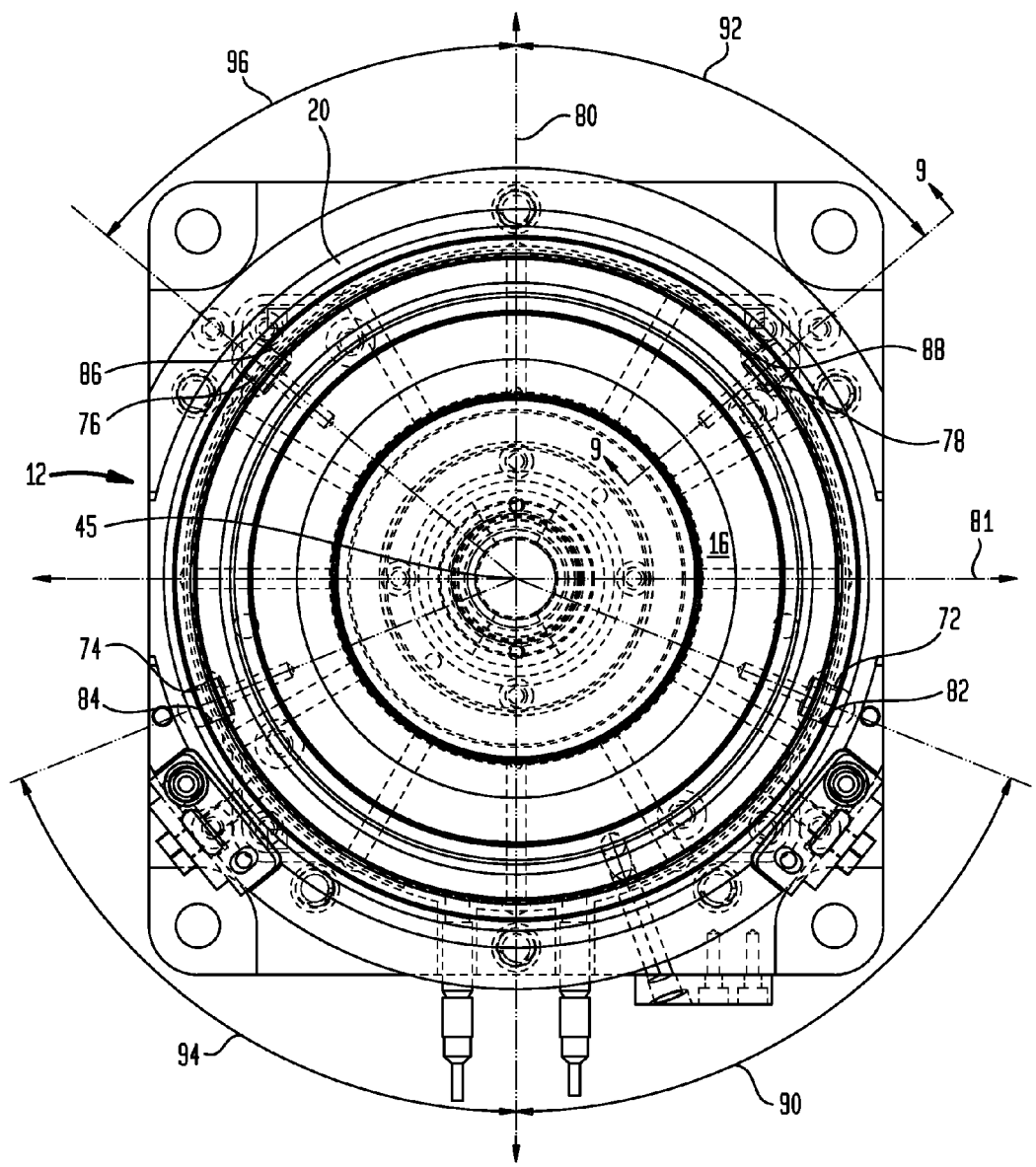

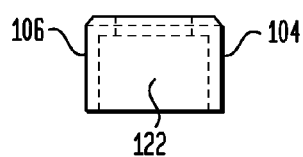
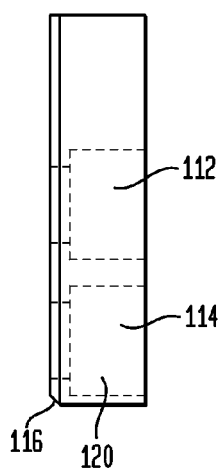
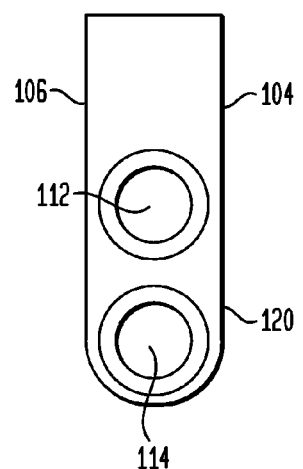
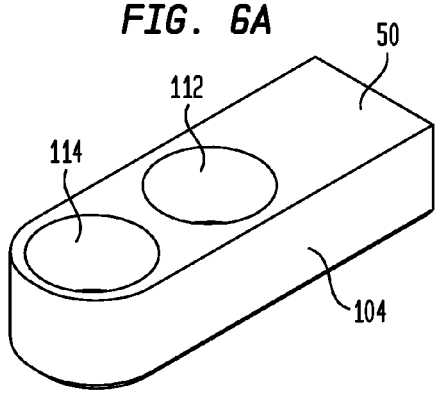
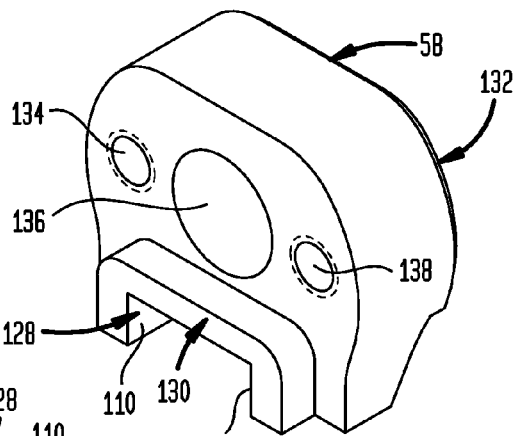
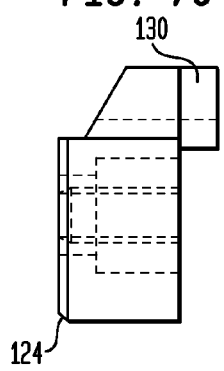
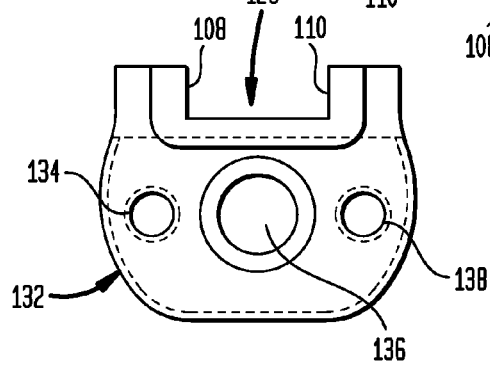

SEGMENTED PRESSWARE DIE SET WITH ANTI-TWIST GUIDE KEYS

CLAIM FOR PRIORITY

This application is based upon U.S. Provisional Patent Application Ser. No. 61/125,698 of the same title, filed Apr. 28, 2008. This application is also a continuation-in-part of copending U.S. patent application Ser. No. 11/465,694, entitled "Pressware Forming Apparatus, Components Therefore and Methods of Making Pressware Therefrom", filed on Aug. 18, 2006 which was based upon U.S. Provisional Patent Application No. 60/709,649, filed on Aug. 19, 2005. The priority of the foregoing applications are hereby claimed and their disclosures incorporated herein by reference.

TECHNICAL FIELD

The present invention relates to the manufacture of pressware from paperboard blanks and, more specifically, to a segmented die set having anti-twist guide keys with generally planar guide surfaces extending in a substantially radial direction. The anti-twist guide system is especially suitable for heated die sets since extra clearances for radial thermal expansion can be eliminated.

BACKGROUND

Pressed paper plates are typically formed from flat blanks. The blanks may be scored around their perimeter to aid in the necessary gathering of the paper during the formation of the product. The folds or pleats created in the final pressware product ideally are pressed and reformed with heat, moisture and pressure to "rebond" the structure and obtain high strength. A preferred apparatus for making paperboard pressware is a heated, segmented die set including a punch and die of the class seen in, for example, U.S. patent application Ser. No. 11/465,694, Publication No. US 2007/0042072 of Johns et al., referred to above. In a typical construction of such die sets, the pressure and draw rings are spring mounted and include cylindrical guide pins to maintain relative position including rotational registration between the outer pressure and draw rings with their respective punch and die base members.

Wearing of the guide pins and their bushings is a problem, as is binding of the pins if too much rotation or twist occurs. The binding problem is particularly exacerbated by relatively significant clearances needed to accommodate thermal expansion of the parts; which expansion largely occurs in a radial direction. The prior art system using pins and bushings does not provide substantial support to the die set segments angularly offset with respect to the machine direction, further aggravating wear issues with the parts as the outer rings bear upon the inner members of the die set during inclined operation. As the die set wears and clearances between parts increases, MD and angular alignment during forming strokes becomes even more problematical and breakage of springs occurs, resulting in downtime and expense.

SUMMARY OF INVENTION

It has been found that guide keys mounted to the die and punch advantageously limit rotation of an outer ring and exhibit surprising reliability and durability. In one aspect, there is provided a segmented pressware die set for making pressware containers from a paperboard blank including: (a) a die defining a shaping recess; (b) a punch defining a shaping surface, the punch and die being mounted for reciprocal motion with respect to each other along a central axis of the die set such that the shaping surface of the punch cooperates with the shaping recess of the die to shape a paperboard blank into a pressware container during a forming cycle as the die set reciprocates over a forming stroke as well as (c) a plurality of guide keys and (d) at least one outer ring. The guide keys are disposed between the outer ring and an inner member of the punch or die; each guide key preferably having a generally planar guide key surface extending in a substantially radial direction from the central axis of the die set. The outer ring mounted to the central member of the punch or die is adapted to reciprocate independently of the punch or die over at least a portion of the forming stroke of a press. The guide keys cooperate with guide channels to limit rotation of the outer ring with respect to the punch or die.

The guide keys and channels have load bearing contact surfaces angularly offset with respect to the machine direction which provide support to the outer rings so as to promote MD, axial and angular alignment with the inner portions of the die set during inclined operation. That is to say, the guide surfaces help to control angular and axial misalignment and tilt as well as bear at least a portion of the weight of the outer rings so that wear due to their weight bearing upon the inner portions of the die set as the outer rings reciprocate is at least partially relieved. Among the surprising results observed, is that die sets with the inventive anti-twist system have undergone up to 30 million cycles without the need for replacement. This is particularly surprising in that the flat contact surfaces may have dimensions of roughly 0.45 inches×0.2 inches or a relatively small area of 0.09 square inches or less.

Further details and advantages will become apparent from the appended drawings and description which follows.

BRIEF DESCRIPTION OF DRAWINGS

The invention is described in detail below with reference to the various Figures wherein like numerals designate similar parts and wherein:

FIG. 3B is a top schematic view of a die of a die set of the present invention, illustrating the positions of guide keys and guide channels;

FIG. 6A through 6D illustrate in more detail a guide key used on the punch of a die set constructed in accordance with present invention;

FIG. 7A through 7C illustrate a wear insert used on a die set constructed in accordance with the present invention;

DETAILED DESCRIPTION

Figure 1:
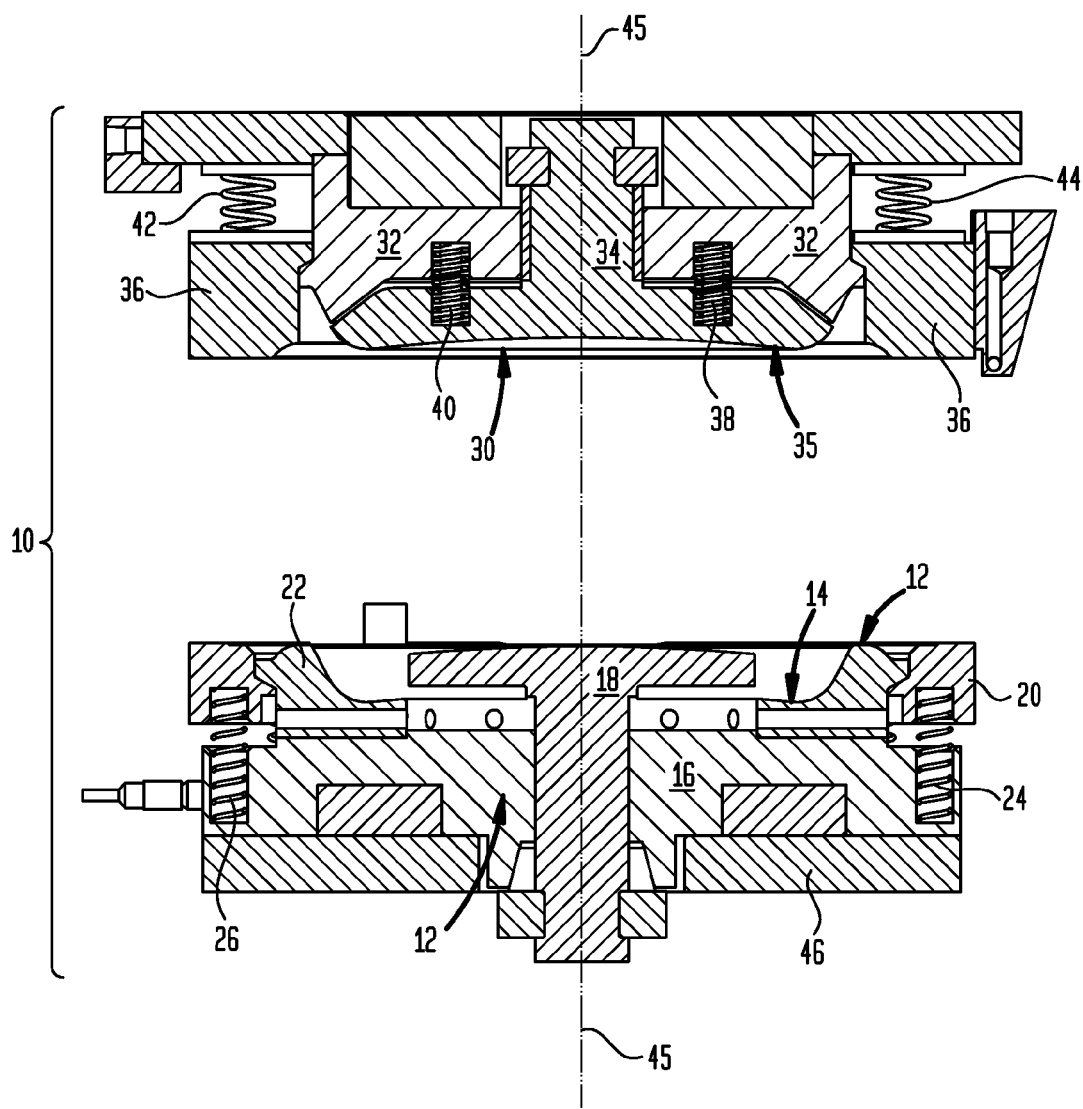
FIG. 1 is a cross sectional, schematic view of a pressware die set of the class utilized in connection with the present invention in an open position.

The present invention is described in detail below with reference to the drawings for purposes of illustration only. Various modifications will be readily apparent to those of skill in the art.

As used herein, terminology has its ordinary meaning, for example "mils" refers to thousandths of an inch. "Asymmetric" and like terminology refers to asymmetry with respect to at least one plane bisecting the apparatus.

"Clearance" refers to spacing between adjacent parts. Clearance is determined at room temperature (22° C., 72° F.) unless otherwise noted.

"Outwardly" from the central axis or like terminology refers to a direction having a substantial radial component with respect to the central axis of the die set.

When we refer to a "substantially radial" direction from the central axis or center of the die set, it will be appreciated that the embodiments illustrated have keys and channels with rectangular geometry such that opposite guide surfaces of the keys and channels are parallel to each other rather than strictly radial in direction. The phraseology "substantially radial" contemplates such geometry as well as any similar geometry where the surfaces extend in a direction which generally approximates a radial direction, usually within 10° of a strictly radial direction.

The following patents and co-pending patent applications contain information as to materials, processing techniques, product design and equipment and are incorporated by reference: U.S. Pat. No. 7,048,176, entitled "Deep Dish Disposable Pressed Paperboard Container"; U.S. Pat. No. 6,932,753, entitled "Food Serving Paperboard Container Pressing Apparatus Employing Cast-In Electrical Heaters"; U.S. Pat. No. 6,893,693, entitled "High Gloss Disposable Pressware"; U.S. Pat. No. 6,733,852, entitled "Disposable Serving Plate With Sidewall-Engaged Sealing Cover"; U.S. Pat. No. 6,715,630, entitled "Disposable Food Container With A Linear Sidewall Profile and an Arcuate Outer Flange"; GP-01-27); U.S. Pat. No. 6,474,497, entitled "Smooth Profiled Food Service Article"; U.S. Pat. No. 6,592,357, entitled "Rotating Inertial Pin Blank Stops for Pressware Die Set"; U.S. Pat. No. 6,589,043, entitled "Punch Stripper Ring Knock-Out for Pressware Die Sets"; U.S. Pat. No. 6,585,506, entitled "Side Mounted Temperature Probe for Pressware Die Set"; U.S. Pat. No. 7,337,943, entitled Disposable Servingware Containers with Flange Tabs"; U.S. patent application Ser. No. 12/259,487, filed Oct. 28, 2008, entitled "Pressed Paperboard Servingware with Arched Bottom Panel and Sharp Brim Transition", currently pending; and U.S. Patent Application Publication No. US 2007/0042072 (U.S. patent application Ser. No. 11/465,694), entitled "Pressware Forming Apparatus, Components Therefore and Methods of Making Pressware Therefrom", currently pending. See also, U.S. Pat. Nos. 5,249,946; 4,832,676; 4,721,500; and 4,609,140, which are particularly pertinent.

Paperboard pressware products are advantageously formed with a heated matched pressware die set utilizing inertial rotating pin blank stops as described in U.S. Pat. No. 6,592,357, issued Jul. 15, 2003, entitled "Rotating Inertial Pin Blank Stops for Pressware Die Sets". For paperboard plate stock of conventional thicknesses in the range of from about 0.010" to about 0.040", the springs upon which the lower die half is mounted are typically constructed such that the full stroke of the upper die results in a force applied between the dies of from about 6000 to 14,000 pounds or higher. Similar forming pressures and control thereof may likewise be accomplished using hydraulics as will be appreciated by one of skill in the art. The paperboard which is formed into the blanks is conventionally produced by a wet laid paper making process and is typically available in the form of a continuous web on a roll. The paperboard stock is preferred to have a basis weight in the range of from about 100 pounds to about 400 pounds per 3000 square foot ream, usually up to about 300 pounds per 3000 square foot ream, and a thickness or caliper in the range of from about 0.010" to about 0.040" as noted above. Lower basis weight paperboard is preferred for ease of forming and to save on feedstock costs. Paperboard stock utilized for forming paper plates is typically formed from bleached pulp fiber and is usually double clay coated on one side. Such paperboard stock commonly has a moisture (water content) varying from about 4.0 to about 8.0 percent by weight prior to moistening.

The effect of the compressive forces at the rim is greatest when the proper moisture conditions are maintained within the paperboard: preferably at least 8% and less than 12% water by weight, and more preferably 9.0 to 10.5%. Paperboard having moisture in this range has sufficient moisture to deform and rebond under sufficient temperature and pressure, but not such excessive moisture that water vapor interferes with the forming operation or that the paperboard is too weak to withstand the forces applied. To achieve the desired moisture levels within the paperboard stock as it comes off the roll, the paperboard is treated by spraying or rolling on a moistening solution, primarily water, although other components such as lubricants may be added. The moisture content may be monitored with a hand held capacitive type moisture meter to verify that the desired moisture conditions are being maintained or the moisture is monitored by other suitable means, such as an infra-red system. It is preferred that the plate stock not be formed for at least six hours after moistening to allow the moisture within the paperboard to equilibrate.

Because of the intended end use of the products, the paperboard stock is typically impregnated with starch and coated on one side with a liquid proof layer or layers comprising a press-applied, water-based coating applied over the inorganic pigment typically applied to the board during manufacturing. Carboxylated styrene-butadiene resins may be used with or without filler if so desired. In addition, for esthetic reasons, the paperboard stock is often initially printed before being coated with an overcoat layer. As an example of typical coating material, a first layer of latex coating may be applied over the printed paperboard with a second layer of acrylic coating applied over the first layer. These coatings may be applied either using the conventional printing press used to apply the decorative printing or may be applied using some other form of a conventional press coater. Preferred coatings utilized in connection with the invention may include 2 pigment (clay) containing layers, with a binder, of about 6 lbs/3000 ft² ream or so followed by 2 acrylic layers of about 0.5-1 lbs/3000 ft² ream. The clay containing layers are provided first during board manufacture and the acrylic layers are then applied by press coating methods, i.e., gravure, coil coating, flexographic methods and so forth as opposed to extrusion or film laminating methods which are expensive and may require off-line processing as well as large amounts of coating material. An extruded film, for example, may require 25 lbs/3000 ft$^2$ ream.

A layer comprising a latex may contain any suitable latex known to the art. By way of example, suitable latexes include styrene-acrylic copolymer, acrylonitrile styrene-acrylic copolymer, polyvinyl alcohol polymer, acrylic acid polymer, ethylene vinyl alcohol copolymer, ethylene-vinyl chloride copolymer, ethylene vinyl acetate copolymer, vinyl acetate acrylic copolymer, styrene-butadiene copolymer and acetate ethylene copolymer. Preferably, the layer comprising a latex contains styrene-acrylic copolymer, styrene-butadiene copolymer, or vinyl acetate-acrylic copolymer. More preferably, the layer comprising a latex contains vinyl acetate ethylene copolymer. A commercially available vinyl acetate ethylene copolymer is "AIRFLEX® 100 HS" latex. ("AIRFLEX® 100 HS" is a registered trademark of Air Products and Chemicals, Inc.) Preferably, the layer comprising a latex contains a latex that is pigmented. Pigmenting the latex increases the coat weight of the layer comprising a latex thus reducing runnability problems when using blade cutters to coat the substrate. Pigmenting the latex also improves the resulting quality of print that may be applied to the coated paperboard. Suitable pigments or fillers include kaolin clay, delaminated clays, structured clays, calcined clays, alumina, silica, aluminosilicates, talc, calcium sulfate, ground calcium carbonates, and precipitated calcium carbonates. Other suitable pigments are disclosed, for example, in Kirk-Othmer, Encyclopedia of Chemical Technology, Third Edition, Vol. 17, pp. 798, 799, 815, 831-836. Preferably the pigment is selected from the group consisting of kaolin clay and conventional delaminated coating clay. An available delaminated coating clay is "HYDRAPRINT™" slurry, supplied as a dispersion with a slurry solids content of about 68%. "HYDRAPRINT™" slurry is a trademark of Huber. The layer comprising a latex may also contain other additives that are well known in the art to enhance the properties of coated paperboard. By way of example, suitable additives include dispersants, lubricants, defoamers, film-formers, antifoamers and crosslinkers. By way of example, "DISPEX™ N-4" is one suitable organic dispersant and comprises a 40% solids dispersion of sodium polycarboxylate. "DISPEX™ N-40" is a trademark of Allied Colloids. By way of example, "BERCHEM™ 4095" is one suitable lubricant and comprises 100% active coating lubricant based on modified glycerides. "BERCHEM™ 4095" is a trademark of Bercen. By way of example, "Foamaster™ DF-177NS" is one suitable defoamer. "Foamaster™ DF-122 NS" is a trademark of Henkel. In a preferred embodiment, the coating comprises multiple layers that each comprise a latex.

Typically paperboard for containers contains up to about 6% starch; however, the rigidity can be considerably enhanced by using paperboard with from about 9 to about 12 weight percent starch. See U.S. Pat. Nos. 5,938,112 and 5,326,020, the disclosures of which are incorporated herein by reference.

The stock is moistened on the uncoated side after all of the printing and coating steps have been completed. In a typical forming operation, the web of paperboard stock is fed continuously from a roll through a scoring and cutting die to form the blanks which are scored and cut before being fed into position between the upper and lower die halves. The die halves are heated as described above, to aid in the forming process. It has been found that best results are obtained if the upper die half and lower die half—particularly the surfaces thereof—are maintained at a temperature in the range of from about 250° F. to about 400° F., and most preferably at about 325° F.±25° F. These die temperatures have been found to facilitate rebonding and the plastic deformation of paperboard in the rim areas if the paperboard has the preferred moisture levels. At these preferred die temperatures, the amount of heat applied to the blank is sufficient to liberate the moisture within the blank and thereby facilitate the deformation of the fibers without overheating the blank and causing blisters from liberation of steam or scorching the blank material. It is apparent that the amount of heat applied to the paperboard will vary with the amount of time that the dies dwell in a position pressing the paperboard together. The preferred die temperatures are based on the usual dwell times encountered for normal plate production speeds of 40 to 60 pressings a minute, and commensurately higher or lower temperatures in the dies would generally be required for higher or lower production speeds, respectively.

Without intending to be bound by theory, it is believed that increased moisture, temperature, and pressure in the region of the pleat during pleat formation facilitates rebonding of lamellae in the pleats; accordingly, if insufficient rebonding is experienced, it can generally be addressed by increasing one or more of temperature, pressure or moisture.

Figure 2:
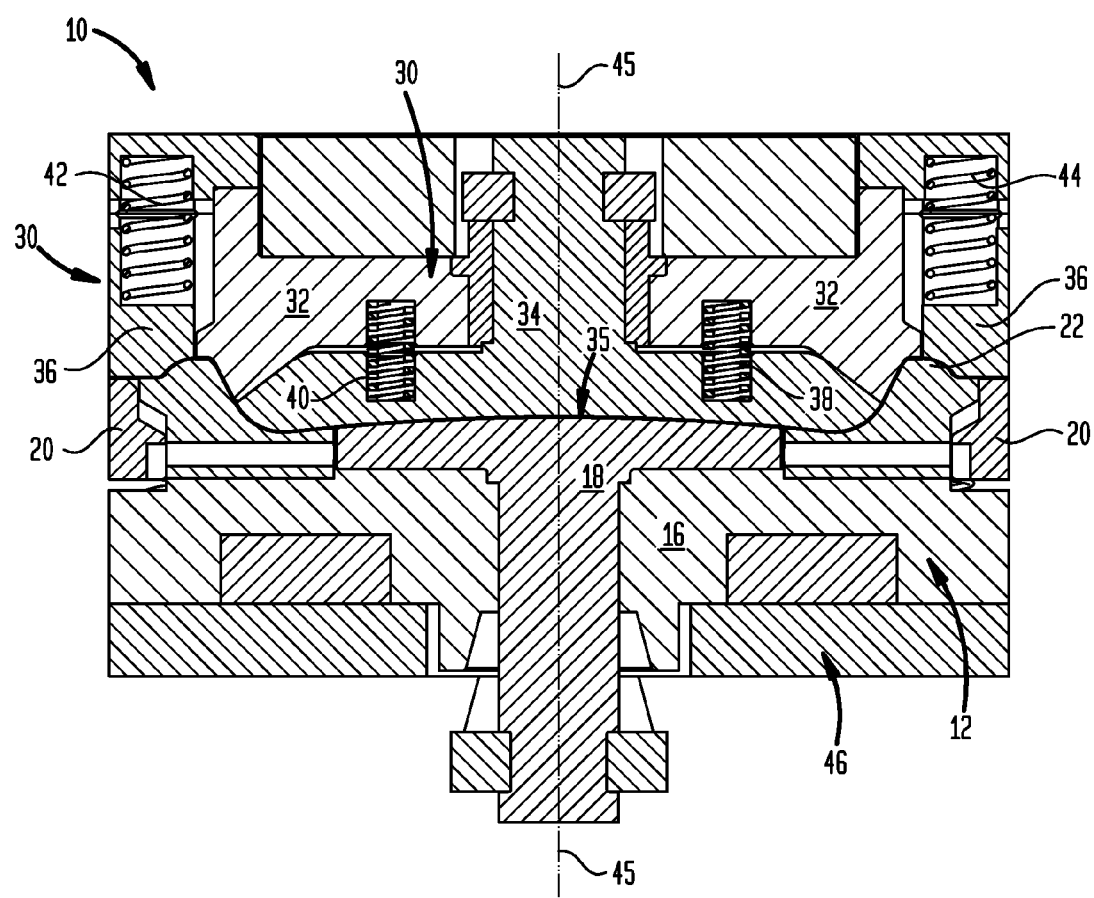
FIG. 2 is a schematic view in cross section of a segmented die set of the class used in connection with the present invention, wherein the die set is shown in a closed position for forming pressware from a paperboard blank.

Referring to FIGS. 1 and 2 there is shown respectively in FIG. 1 a segmented die set 10 in an open position and in FIG. 2 the segmented die set of FIG. 1 in a closed position. Die set 10 includes a die 12 having a shaping recess 14 defined, in part, by a die base 16, as well as a die knock out 18. Also provided is an outer draw ring 20. Die base 16 also defines a contour portion 22 corresponding to the outer portion of a container formed by the die set. Draw ring 20 is mounted on a plurality of springs such as springs 24 and 26.

Conventionally, draw ring 20 is also mounted with a plurality of cylindrical pins to position ring 20 with respect to base 16. That is, to prevent rotation of ring 20 with respect to base 16. Knock out 18 is also mounted on springs and biased away from base 16 in the open position as shown in FIG. 1.

Die set 10 also includes a punch 30 having a punch base 32, a punch knock out 34 defining a shaping surface 35 and a pressure ring 36. Optionally, the pressure ring forms part of a product forming surface as well. A plurality of springs such as springs 38 and 40 bias knock out 34 away from punch base 32 in the open position as shown in FIG. 1. So also a plurality of springs such as springs 42 and 44 bias pressure ring 36 away from base 32 as shown. Conventionally, ring 36 is mounted on a plurality of cylindrical keys or pins to position ring 36 relative to base 32. The guide keys of the present invention illustrated in FIG. 3A and following, position the pressure ring 36 in order to prevent rotation of the ring relative to base 32. It is seen in FIGS. 1 and 2 that the pressure ring has a smaller diameter at its upper portion than at its lower portion and conversely, that the draw ring has a smaller diameter at its lower portion than at its upper portion in order to limit travel relative to the punch and die bases. These features are appreciated in particular by reference to FIGS. 5B and 10 as well as the discussion which follows.

It will be appreciated from FIG. 2 in particular which depicts die set 10 in a closed or forming position, that outer rings 20, 36 reciprocate independently of the punch and die respectively over a portion of the forming cycle. Die set 10 is mounted to a forming press (not shown) optionally with a spacer plate 46 if multi-level operation is desired.

In an open position shown in FIG. 1 pressure ring 36 is biased away from die base 32 by springs 42, 44 while draw ring 20 is biased away from die base 16 by springs such as springs 24 and 26. In the position shown in FIG. 2, a closed or forming position, rings 36 and 20 are in a relatively withdrawn position relative to punch base 32 and die base 16 as the die set forms a pressware container.

A recurring problem with prior art die sets of the class shown in FIGS. 1 and 2 is that the guide pins tend to wear with their cylindrical bushings relatively rapidly. Without intending to be bound by any theory, it is believed that a cylindrical pin in a round hole undergoes initial wear in a "line" of contact, especially when the die set is inclined, accelerating wear such that alignment of the parts during forming strokes deteriorates. This problem is particularly acute with respect to the punch member since pressure ring 36 is relatively heavy. The outer rings tends to move in the machine direction (MD) during inclined die set operation due to gravity, bearing upon surfaces of the inner segments of the die set, further aggravating wear issues and allowing twist and MD mis-alignment of the die set segments. This results in failure of the unit including spring breakage and so forth, causing shut-down of the press.

In accordance with the present invention there is provided a plurality of guide keys with flat surfaces and channels with corresponding flat surfaces which have provided surprising durability. The guide pins prevent binding while wear inserts make it relatively easy and inexpensive to replace worn components without replacing the entire part as will be appreciated from the discussion which follows. Among the surprising results observed, is that die sets with the inventive anti-twist system have undergone up to 30 million cycles without the need for replacement. This is particularly surprising in that the flat contact surfaces may have dimensions of roughly 0.45 inches×0.2 inches or a relatively small area of 0.09 square inches or less. The guide keys and channels have load bearing contact surfaces angularly offset with respect to the machine direction which provide support to the outer rings so as to promote MD, axial and angular alignment with the inner portions of the die set during inclined operation. That is to say, the guide surfaces appear to bear a substantial portion of the weight of the outer rings so that the weight is not against the inner portions of the die set as the outer rings reciprocate with respect thereto. Without intending to be bound by theory, it is believed that the surfaces of the keys and channels of the inventive construction are operative to reduce frictional wear by bearing at least some of the weight of the outer rings and by maintaining better MD and axial alignment in the apparatus, thus reducing "eccentric" wear as well. That is to say, better alignment between parts helps to at least partially reduce eccentric cylindrical wear due to an outer ring tilting out of axial alignment with respect to the punch base or die base such that frictional contact occurs as the apparatus reciprocates.

The particular construction employed is shown in detail in the Figures which follow for purposes of exemplification only.

Figure 3A:
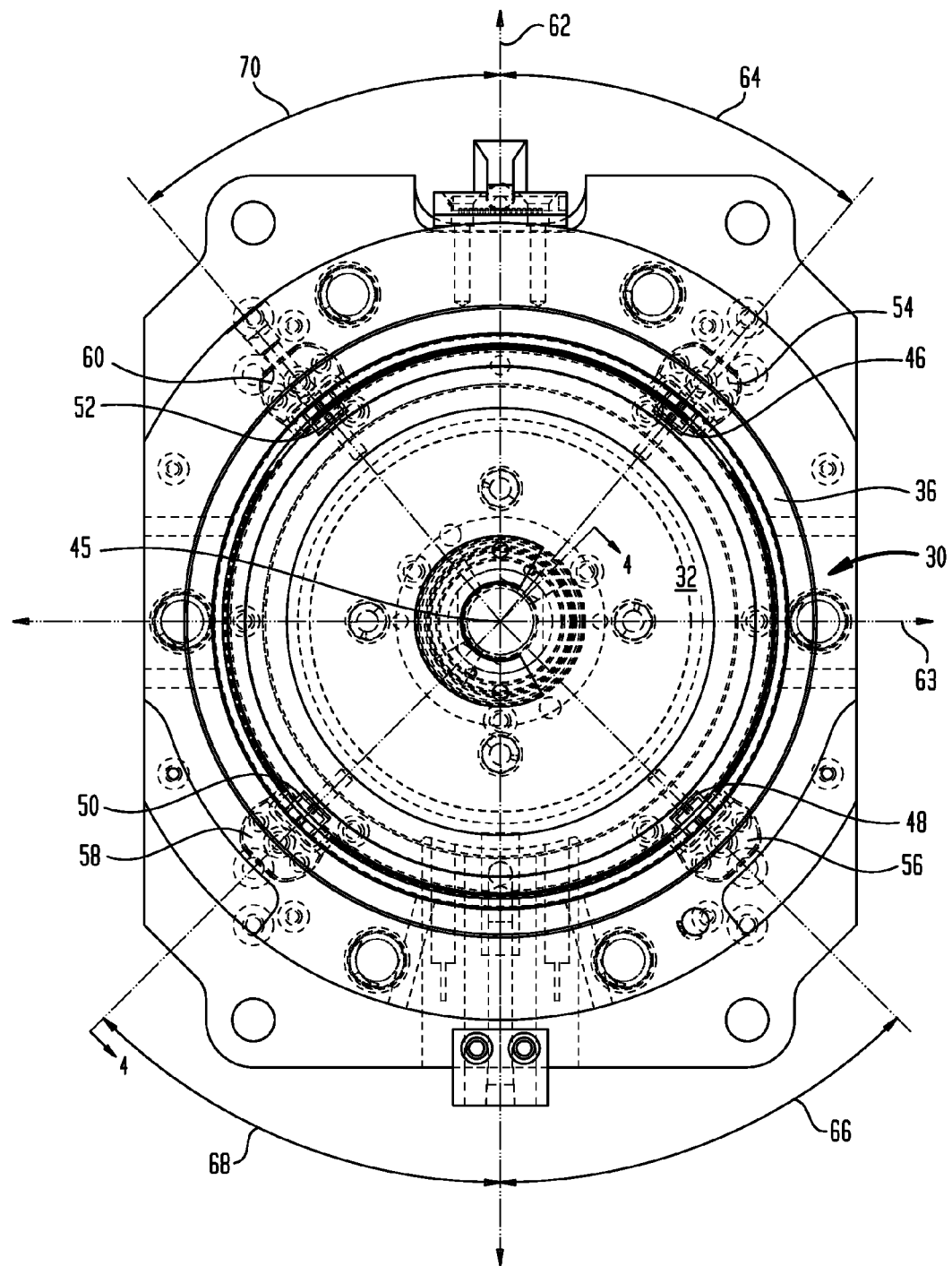
FIG. 3A is a top schematic view of a punch of a die set of the present invention, illustrating the positions of guide keys and guide channels.

For purposes of illustrating the various positions of the guide keys and channels of the present invention, there is shown in FIGS. 1 and 2 as well as on FIGS. 3A and 3B a central axis 45 which passes through the center of punch 30 and die 12. The die set reciprocates upwardly and downwardly along central axis 45 from the open position shown in FIG. 1 to the closed position shown in FIG. 2 over the stroke of a forming press.

There is shown in FIG. 3A a top schematic view of punch 30 illustrating the location of a plurality of guide keys 46, 48, 50 and 52 which are attached to punch base 32. A plurality of U-shaped wear inserts 54, 56, 58, and 60 are attached to pressure ring 36 as shown.

The various guide channels and keys are asymmetrically disposed with respect to a plane 63 bisecting punch 30 along the cross machine direction (CD) for example. That is to say, a first angle 66 and a second angle 68 between the keys and a plane at 62 may be 45° or so while a third angle 64 and a fourth angle 70 may be 40°. In this manner the punch will only "fit" with outer pressure ring 36 in one orientation so that assembly errors may be avoided; even though positioning is generally symmetrical with respect to the plane at 62.

FIG. 3B is a plan view of die 12 including die base 16 as well as draw ring 20. There is provided on die base 16 a plurality of keys such as keys 72, 74, 76 and 78 which are received in a plurality of channels 82, 84, 86 and 88 which are in draw ring 20.

The end channels are likewise asymmetrically disposed with respect to a plane 81 which bisects die 12 along the CD. In this regard, a first angle 90 and a second angle 94 between the keys and a plane at 80 may be 50° or so while a third angle 92 and a fourth angle 96 may be about 45°. Here again, the asymmetric placement of the guide keys and channels with respect to a plane at 81 prevents mis-assembly of the draw ring to die 12.

Figure 3C:
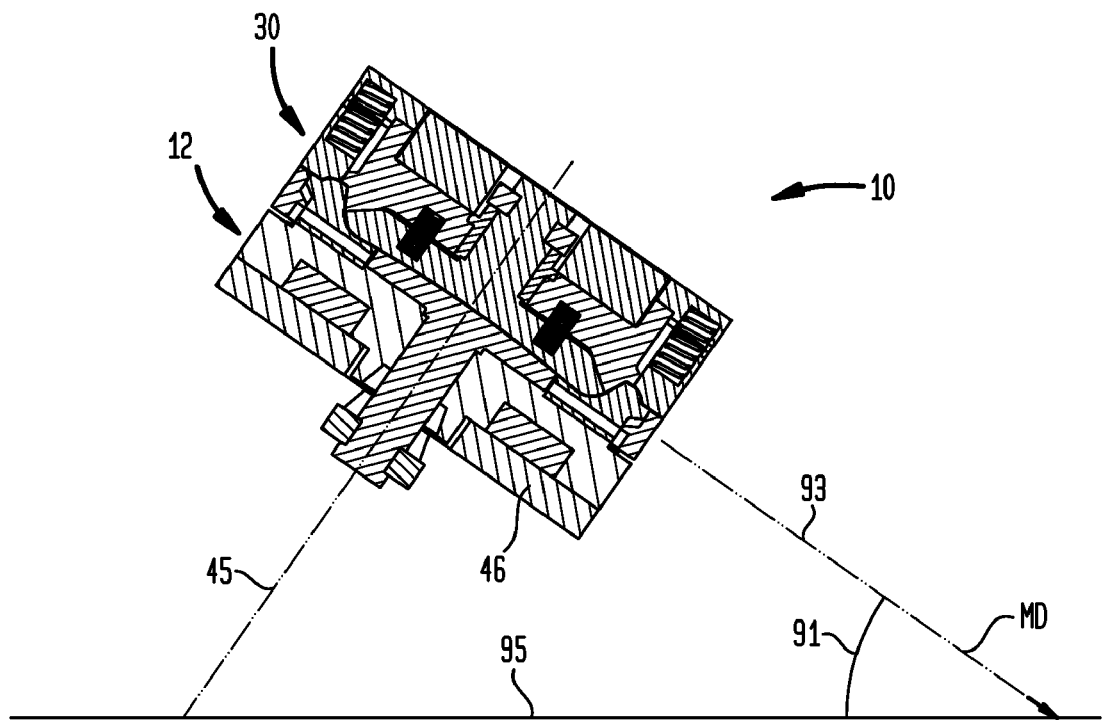
FIG. 3C is a side schematic view of a die set in an inclined position with respect to horizontal.

In operation, it is typical to incline a die set of the class shown in FIGS. 1 through 3B above along a machine direction 93 as illustrated in FIG. 3C. It is seen in FIG. 3C that die set 10 is disposed along machine direction (MD) 93 of a production line as shown in the diagram. The machine direction is inclined at an angle 91 with respect to horizontal plane 95. Angle 91 may be 45° or so. In most cases angle 91 will be greater than 20° and in most cases greater than 30°. Generally the die set is not inclined in the cross machine direction, i.e. perpendicular to the machine direction such that the attitude of the die set orientation is along a plane at 93 into the paper such that there is no inclination with respect to the cross machine direction. In other words, the die set forming surfaces are inclined in the machine direction, but horizontal along the cross machine direction.

The keys and channels representing the anti-twist assembly of the present invention are shown in more detail in FIGS. 4 through 10. It will be appreciated from these Figures that the key and channel surfaces are generally aligned in a radial direction with respect to central axis 45. Inasmuch as the aligning surfaces of the keys and channels are radial, the channels and keys need to be offset from the machine direction i.e. from planes 62 and 80 shown in FIGS. 3A and 3B. Otherwise, the surfaces will not be effective to bear some of the weight or load of the pressure and draw rings as they reciprocate independently of the punch and die respectively. To this end, the guide keys and channels are generally angularly offset with respect to the machine direction by at least 20° or 30°. More preferably, the guide keys and guide channels are angularly offset with respect to the machine direction by at least 40° or 50°. Offset angles of from 20° or 30° up to 90° are suitable.

Although it would be somewhat ideal to have the keys and channels offset from the machine direction by 90° this may or may not be possible depending upon other components present in the die set such as heaters, temperature probes and so forth. As is appreciated from FIGS. 3A-3C, the guide keys and channels will most effectively bear the weight of the draw and pressure rings when offset by the machine direction by 90°.

Figure 4:
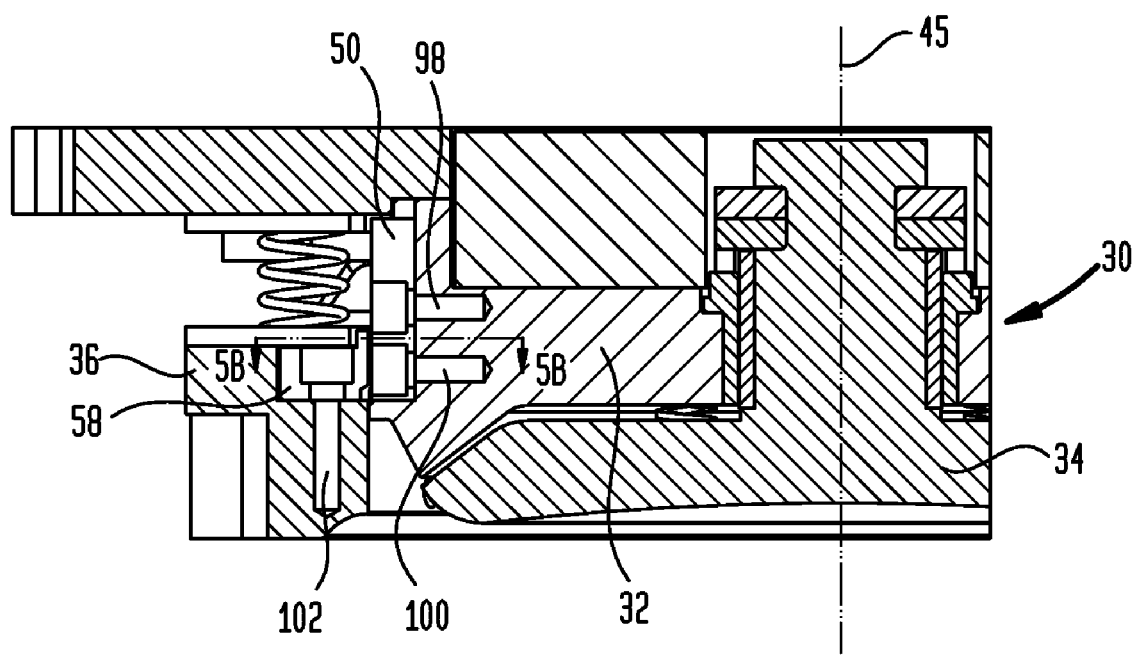
FIG. 4 is a detail along line 4-4 of FIG. 3*a* illustrating a guide pin and wear insert (in section) located on the punch and pressure ring.

FIG. 4 is a section along line 4-4 of FIG. 3A showing a portion of punch 30 including a portion of punch base 32, knock out 34 as well as pressure ring 36. It is seen in FIG. 4 that key 50 (which is substantially identical to the other keys) is secured to punch base 32 by a pair of bolts 98 and 100. Wear insert 58 is secured to pressure ring 36 by a bolt 102.

The keys of the punch, such as key 50 and the wear inserts of the pressure ring such as wear insert 58, are illustrated in FIGS. 5A-7D.

Figure 5A:
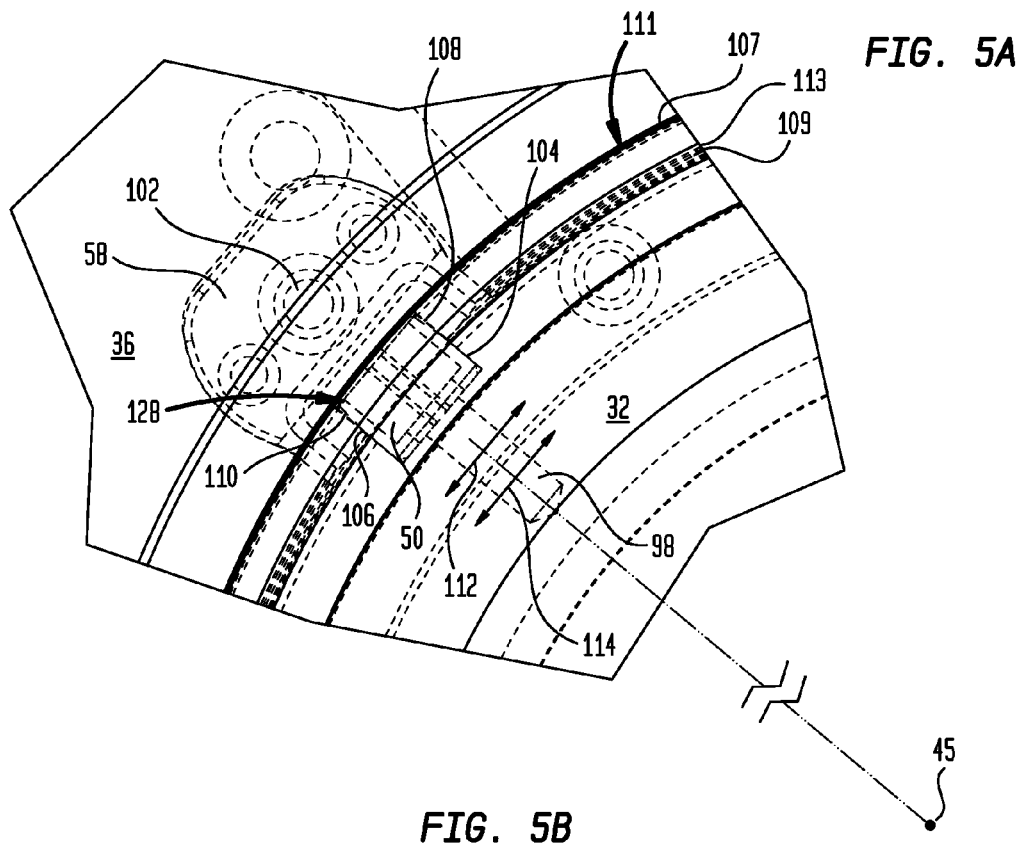
FIG. 5A is a detail showing a top view of a guide key and wear insert shown in FIG. 4.

FIG. 5A is a top schematic view showing key 50 as well as wear insert 58 as well as bolts 98, 102. It will be appreciated from FIGS. 5A-5C and 6A-6D that key 50 has a pair of opposed radially extending, generally planar surfaces 104, 106 in surface to surface facing relationship with a pair of opposed surfaces 108, 110 of wear insert 58 which define a guide channel 128. Surfaces 108, 110 are likewise radially extending. The overall clearance between the key and wear insert is 0.0035 inches per side or 0.007 inches across the full width. When we refer to a "surface clearance" we refer to the clearance per side at room temperature (22° C., 72° F.). The clearance is indicated schematically at 112, 114 (FIG. 5A) where 114 is the channel width and 112 is the distance between opposed surfaces 104, 106 of key 50.

Figure 5B:
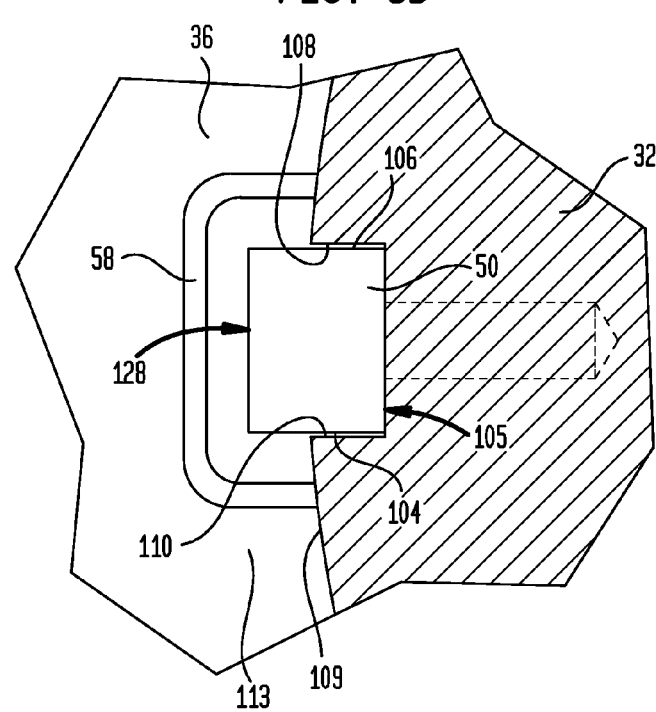
FIG. 5B is a schematic detail along line 5B-5B of FIG. 4 showing the geometry of FIG. 5A at level 5B.
Figure 5C:
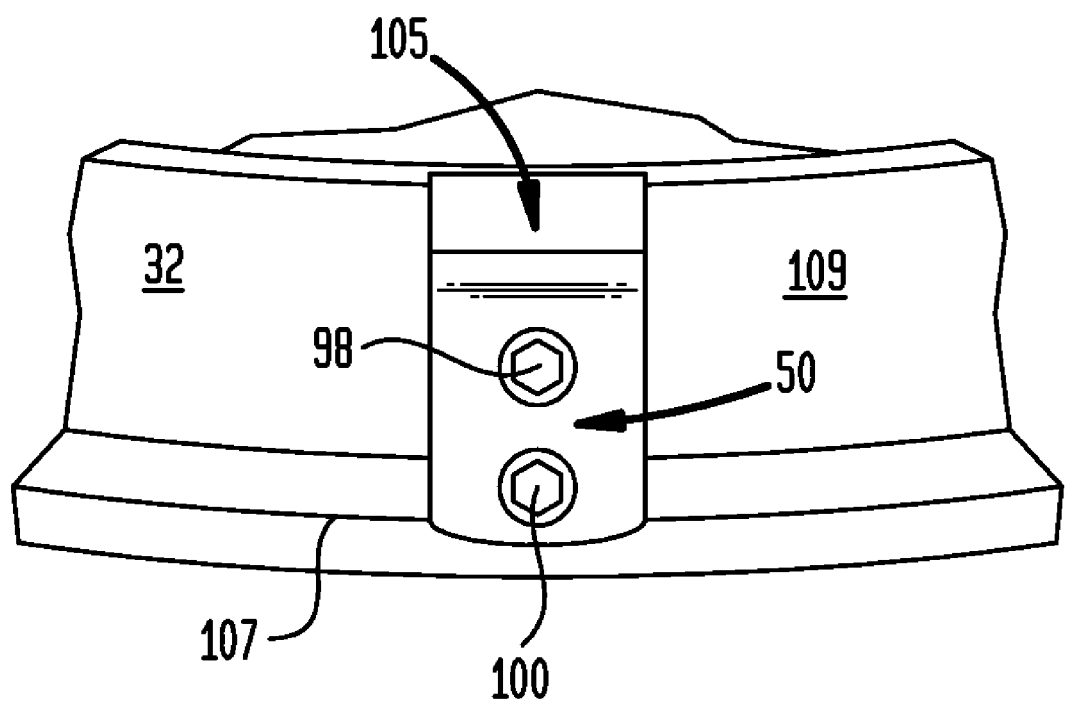
FIG. 5C is a view in perspective of a guide key mounted on the periphery of the punch in a machined "pocket" which is shaped to accommodate the guide key.
Figure 8B:
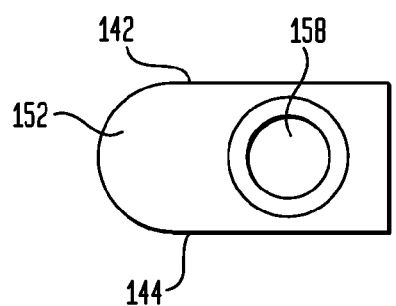
FIGS. 8A through 8D illustrate a die side guide key used in connection with a die set constructed in accordance with the present invention.
Figure 8A:
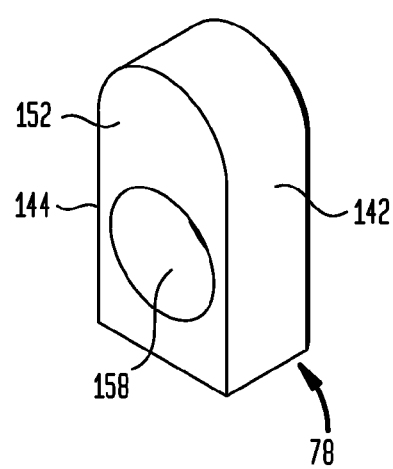
Figure 8D:
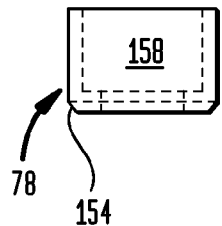
Figure 8C:
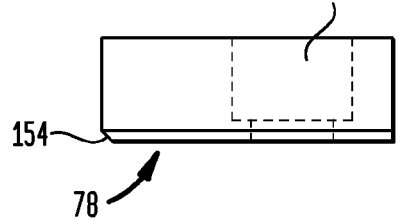

FIGS. 5B and 5C are provided to show further details as to the geometry of the system. FIG. 5B is a schematic plan/partial sectional view along line 5B-5B of FIG. 4 showing key 50 and an exposed portion of wear inset 58, and FIG. 5C is a perspective view showing key 50 mounted in a pocket 105 of punch base 32 adjacent to a lower, outwardly projecting annular projection 107 of punch base 32 such that the key projects outwardly from wall 109 so that it resides in channel 128 to prevent twisting when the punch is installed as shown in FIGS. 4 and 5A-5B.

Pocket 105 is dimensioned such that it engages part of the key when the key is bolted to the punch base and both the channel and key are sequestered from the forming area, that is, the area between shaping surface 35 and recess 14. The pocket is sized to fit to the key essentially with minimal clearance so that the key is securely held and maintains its position as the die set reciprocates.

The relative shapes and dimensions of the various parts are appreciated from FIGS. 5A, 5B and 5C, wherein it is seen that the lower inside wall 111 of pressure ring 36 is radially disposed just outwardly of ledge 107 of punch 32 and that key 50 resides about equally over its radial extent in pocket 105 of punch 32 and in channel 128 at the upper portion 109 of the punch base and the upper portion 113 of ring 36.

By virtue of this construction, it is seen that key 50 and channel 128 are sequestered from the forming area between the punch and die and will not interfere with production.

FIGS. 6A through 6D are details illustrating the construction of key 50. Key 50 has upper and lower bolt holes 112, 114 as well as a chamfered edge 116. The chamfered edge is at a lower portion 120 of the guide key, and disposed on the inner portion as shown to assist in mounting of the part. The bolt holes typically have an expanded region such as region 122 to accommodate the bolt heads.

FIGS. 7A through 7C are details illustrating construction of wear insert 58. The other wear inserts have substantially the same construction.

FIG. 7A is a perspective view of wear insert 58 which has a chamfered edge 124 (also positioned on an inner portion to assist in mounting of the part) as well as a U-shaped channel 128. The U-shaped channel 128 defines on its two "legs" surfaces 108 and 110. Also provided is a raised channel portion 130 which provides for more vertical length of channel 128. The wear insert has a body 132 as well as a plurality of holes 134, 136 and 138. Hole 136 is used for securing the wear insert to the pressure ring while holes 134 and 138 can be used for jacking bolts to remove the wear insert when it needs to be replaced.

It will be appreciated by one of skill in the art that the chamfered regions of the inserts and keys provide for easier insertion of the keys and wear inserts into their respective accommodating parts.

Figure 9:
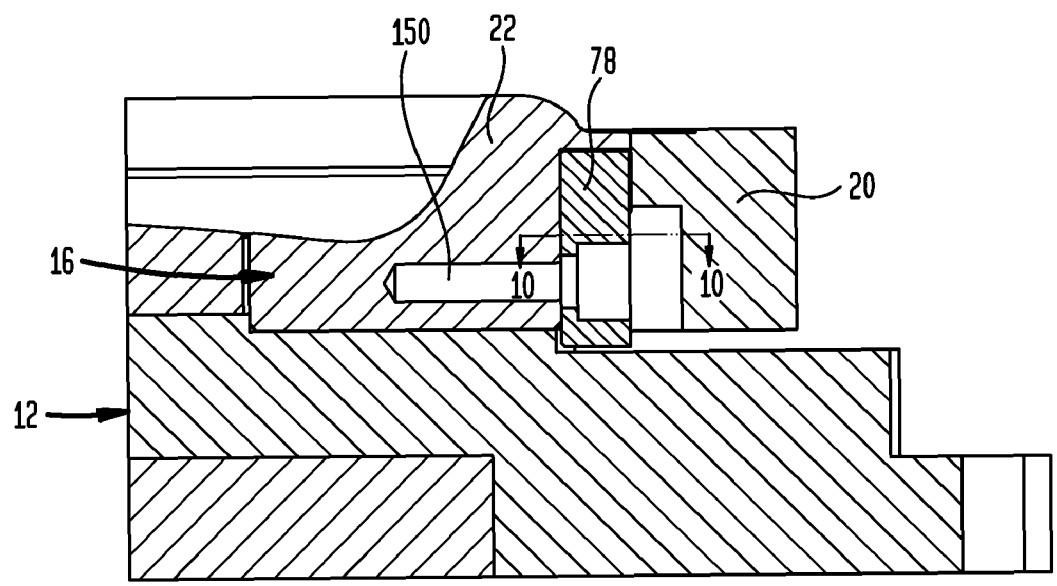
FIG. 9 is a detail along line 9-9 of FIG. 3B showing a guide key of the present invention in section disposed in a channel of a draw ring of a segmented die set.
Figure 10:
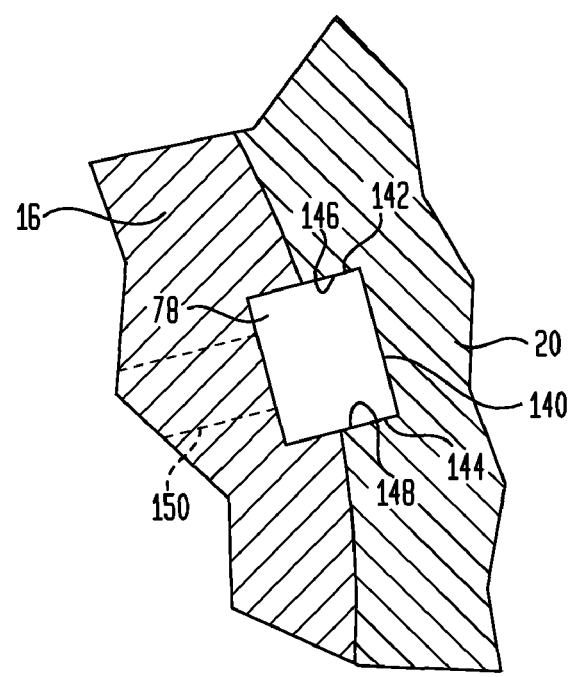
FIG. 10 is a schematic illustration along line 10-10 of FIG. 9 illustrating the die side guide key of FIGS. 8A-8D and 9 disposed in the guide channel of a draw ring of a die set constructed in accordance with the present invention.

The anti-twist features of die 12 are similar to those of the punch and are further illustrated in FIGS. 8A through 10. FIG. 8A-8D illustrate the construction of a die side guide key 78. FIG. 9 is a view in section and elevation along line 9-9 of FIG. 3B. It is seen in FIG. 9 that key 78 is bolted to die base 16 adjacent contour 22. Key 78 cooperates with a channel 140 in draw ring 20 as is illustrated in FIG. 10, much like the guide keys on the punch. FIG. 10 is a schematic sectional view along line 10-10 of FIG. 9 showing the relative position of key 78, die base 16 and draw ring 20 at a "lower" portion of draw ring 20, that is, below the outmost annular portions of die 12. Here again, the key is disposed in a "pocket" of the die base which engages part of the key such that the when the key is secured to the die base and both the channel and key are sequestered from the forming area. The pocket in the die base is sized to fit to the key with minimal clearance so that the key maintains its position as the die set reciprocates. The construction of the other die side keys and channels and their cooperation with the draw ring are the same as that of key 78 and channel 140 of draw ring 20. Each key has a pair of opposed surfaces 142, 144 which rest in channel 140. Channel 140 has a pair of opposed surfaces 146, 148 which cooperate with the keys as described above in connection with the keys of punch 30. The construction of the keys bolted to the die by way of bolt 150 is shown in FIG. 9. In FIGS. 8a-8d it is seen that key 78 has an upper portion 152 with a pair of chamfered edges 154 as well as a hole 158 on its lower portion to accommodate bolt 150. Guide surfaces 142, 144 cooperate with the guide surfaces 146, 148 of channel 140 in order to prevent twisting of draw ring 20 with respect to die base 16.

The anti-twist and load-bearing features are achieved by the radially extending guide surfaces of the keys and channels as will be appreciated from the various drawings and the foregoing discussion. The guide keys are positioned, configured and dimensioned to engage the outer ring in order to eliminate rotation, or twist, of the outer ring with respect to the punch or die. While the guide keys and optional wear insert may be made of any suitable material, both may be made of ductile iron. "Ductile iron" is preferred since it contains graphite in the metal matrix which provides some lubrication and extra wear resistance. It will be appreciated by one of skill in the art that topical lubricants, such as oil, powders and the like, are not readily employed because they might contaminate the pressware. The inventive construction provides for a much "tighter" design. Clearances between conventional round pins and bushings are approximately 0.016 inch or so or 0.008 inch or so per side at room temperature (22° C., 72° F.) in order to accommodate thermal expansion. On the other hand, clearance between the rectangular keys and wear insert may be as little as 0.0035 inch per side or 0.007 inch across the full width; less than half the clearance than in a conventional system. A much tighter clearance allows for more accurate positioning even if a hot punch or die is used. Radial alignment of flat surfaces will accommodate the thermal expansion which is generally occurs along a radial direction. Generally there are provided at least three and up to 10 guide keys on the punch or die. The guide keys and channels are asymmetrically disposed around the periphery of the punch or die such that the outer ring can only be placed around the punch or die in a single position. In a preferred construction, the guide channels are defined by a plurality of removable inserts secured to the outer ring and the die set is a heated die set. The guide keys and wear inserts of the present invention are especially advantageous when used on the punch and pressure ring of a conventional die set because the radially extending, generally planar surfaces, are load bearing surfaces and act to distribute the load particularly in connection with an inclined die set. Conventional cylindrical pins and round bushings, on the other hand, tend to define a "line" of contact as noted above such that initial wear is sometimes severe, limiting the durability of the die set. In many commercial cases, the die set is inclined at least 20° with respect to the horizontal and in many cases at least 30° with respect to horizontal. A 45° inclination with respect to horizontal is somewhat typical.

ILLUSTRATIVE EMBODIMENTS

Following is a numbered listing of embodiments which may be practiced in connection with the invention of this application.

Embodiment No. 1 is a segmented pressware die set for making pressware containers from a paperboard blank comprising: (a) a die defining a shaping recess; (b) a punch defining a shaping surface, the punch and die being mounted for reciprocal motion with respect to each other along a central axis of the die set such that the shaping surface of the punch cooperates with the shaping recess of the die to shape a paperboard blank into a pressware container during a forming cycle as the die set reciprocates over a forming stroke; (c) at least one outer ring mounted to an inner member of the punch or die adapted to reciprocate independently of the inner member of the punch or die over at least a portion of the forming stroke, (d) a plurality of guide keys mounted between an outer periphery of the inner member of the punch or die and an inner periphery of the outer ring, each guide key having a portion extending outwardly from the central axis of the die set; and wherein the guide keys are positioned, configured and dimensioned to limit rotation of the outer ring with respect to the inner member punch or die.

Embodiment No. 2 is the segmented pressware die set according to Embodiment No. 1, wherein the die set is a heated die set.

Embodiment No. 3 is the segmented pressware die set according to Embodiments 1 or 2, wherein the outer ring is spring-mounted to the die or punch.

Embodiment No. 4 is the segmented pressware die set according to Embodiments 2 or 3, wherein the outer ring is a pressure ring mounted to the punch.

Embodiment No. 5 is the segmented pressware die set according to Embodiment 4, wherein the punch has a segmented forming surface defined, in part, by the outer pressure ring.

Embodiment No. 6 is the segmented pressware die set according to Embodiment 5, further comprising a draw ring mounted to an inner member of the die adapted to reciprocate independently of the die over at least a portion of the forming stroke.

Embodiment No. 7 is the segmented pressware die set according to Embodiment 6, wherein there is provided a second plurality of guide keys mounted to a periphery of the die, each of the second plurality of guide keys extending outwardly from the central axis of the die set and wherein the second plurality of guide keys are positioned, configured and dimensioned to engage the draw ring in order to limit rotation of the draw ring with respect to the die.

Embodiment No. 8 is the segmented pressware die set according to any of the preceding Embodiments, disposed in an inclined position with respect to horizontal.

Embodiment No. 9 is the segmented pressware die set according to any of the preceding embodiments, wherein the die set has from 3 to 10 guide keys.

Embodiment No. 10 is the segmented pressware die set according to any of the preceding embodiments, wherein the die set is configured to form a container with a generally planar bottom portion, a transition portion which extends upwardly and outwardly and an outwardly extending brim portion.

Embodiment No. 11 is a segmented pressware die set for making pressware containers from a paperboard blank comprising: (a) a die defining a shaping recess; (b) a punch defining a shaping surface, the punch and die being mounted for reciprocal motion with respect to each other along a central axis of the die set such that the shaping surface of the punch cooperates with the shaping recess of the die to shape a paperboard blank into a pressware container during a forming cycle as the die set reciprocates over a forming stroke; (c) at least one outer ring mounted to an inner member of the punch or die adapted to reciprocate independently of the inner member of the punch or die over at least a portion of the forming stroke, (d) a plurality of guide keys mounted on a periphery of the inner member of at least one of the punch or die, each guide key extending outwardly from the central axis of the die set; and wherein the guide keys are positioned, configured and dimensioned to engage the outer ring in order to limit rotation of the outer ring with respect to the inner member of the punch or die.

Embodiment No. 12 is a segmented pressware die set for making pressware containers from a paperboard blank comprising: (a) a die defining a shaping recess; (b) a punch defining a shaping surface, the punch and die being mounted for reciprocal motion with respect to each other along a central axis of the die set such that the shaping surface of the punch cooperates with the shaping recess of the die to shape a paperboard blank into a pressware container during a forming cycle as the die set reciprocates over a forming stroke; (c) at least one outer ring mounted to an inner member of the punch or die adapted to reciprocate independently of the inner member of the punch or die over at least a portion of the forming stroke; (d) a plurality of guide keys disposed between the outer ring and an inner member of at least one of the punch or die, each guide key having a generally planar guide key surface extending in a substantially radial direction with respect to the central axis of the die set; and (e) a plurality of guide channels adapted to receive the guide keys, each guide channel being provided with a generally planar guide channel surface extending in a substantially radial direction from the central axis of the die set, and wherein the guide keys and guide channels are positioned, configured and dimensioned such that the generally planar guide key surfaces cooperate with the generally planar guide channel surfaces to limit rotation of the outer ring with respect to the inner member of the punch or die.

Embodiment No. 13 is the segmented pressware die set according to Embodiment 12, comprising at least 3 guide keys, each guide key having a generally planar guide key surface extending in a substantially radial direction with respect to the central axis of the die set and at least 3 guide channels on the outer ring, each of which guide channels is provided with a generally planar guide channel surface extending in a substantially radial direction with respect to the central axis of the die set.

Embodiment No. 14 is the segmented pressware die set according to Embodiments 12 or 13, comprising at least 4 guide keys mounted on an inner member of at least one of the punch or die, each guide key having a generally planar guide key surface extending in a substantially radial direction from the central axis of the die set and at least 4 guide channels on the outer ring, each of which guide channels is provided with a generally planar guide channel surface extending in a substantially radial direction from the central axis of the die set.

Embodiment No. 15 is the segmented pressware die set according to Embodiment 14, wherein the guide keys are asymmetrically disposed around a periphery of the inner member of punch or die.

Embodiment No. 16 is the segmented pressware die set according to any of Embodiments 12 through 15, wherein the guide channels are defined by a plurality of removable inserts secured to the outer ring.

Embodiment No. 17 is the segmented pressware die set according to any of Embodiments 12 through 16, wherein the guide key surfaces and guide channel surfaces have a surface-to-surface clearance of 5 mils or less.

Embodiment No. 18 is the segmented pressware die set according to any of Embodiments 12 through 17, wherein the guide key surfaces and guide channel surfaces have a surface-to-surface clearance of 4 mils or less.

Embodiment No. 19 is the segmented pressware die set according to any of Embodiments 12 through 18, wherein the outer ring is a pressure ring mounted to an inner member of the punch.

Embodiment No. 20 is the segmented pressware die set according to any of Embodiments 12 through 19, wherein the guide keys and guide channels are sequestered from a forming area between the punch and die.

Embodiment No. 21 is a segmented pressware die set for making pressware containers from a paperboard blank comprising: (a) a die defining a shaping recess; (b) a punch defining a shaping surface, the punch and die being mounted for reciprocal motion with respect to each other along a central axis of the die set such that the shaping surface of the punch cooperates with the shaping recess of the die to shape a paperboard blank into a pressware container during a forming cycle as the die set reciprocates over a forming stroke; (c) at least one outer ring mounted to an inner member of the punch or die adapted to reciprocate independently of the inner member of the punch or die over at least a portion of the forming stroke and having a plurality of guide channels on an inner periphery thereof, each guide channel being provided with a generally planar guide channel surface extending in a substantially radial direction from the central axis of the die set, and (d) a plurality of guide keys mounted on a periphery of an inner member of at least one of the punch or die, each guide key having a generally planar guide key surface extending in a substantially radial direction from the central axis of the die set; and wherein the guide keys and guide channels are positioned, configured and dimensioned such that the generally planar guide key surfaces cooperate with the generally planar guide channel surfaces to limit rotation of the outer ring with respect to the inner member of the punch or die.

Embodiment No. 22 is the segmented pressware die set according to Embodiment 21, comprising at least 3 guide keys mounted on an inner member of at least one of the punch or die, each guide key having a generally planar guide key surface extending in a substantially radial direction from the central axis of the die set and at least 3 guide channels on the outer ring, each of which guide channels is provided with a generally planar guide channel surface extending in a substantially radial direction from the central axis of the die set.

Embodiment No. 23 is the segmented pressware die set according to Embodiments 21 or 22, comprising at least 4 guide keys mounted on an inner member of at least one of the punch or die, each guide key having a generally planar guide key surface extending in a substantially radial direction from the central axis of the die set and at least 4 guide channels on the outer ring, each of which guide channels is provided with a generally planar guide channel surface extending in a substantially radial direction from the central axis of the die set.

Embodiment No. 24 is the segmented pressware die set according to Embodiment 23, wherein the guide keys are asymmetrically disposed around a periphery of the punch or die.

Embodiment No. 25 is the segmented pressware die set according to any of Embodiments 21, 22, 23 or 24, wherein the guide channels are defined by a plurality of removable inserts secured to the outer ring.

Embodiment No. 26 is the segmented pressware die set according to Embodiments 21 through 25, wherein the die set is a heated die set.

Embodiment No. 27 is the segmented pressware die set according to Embodiments 21 through 26, wherein the guide key surfaces and guide channel surfaces have a surface-to-surface clearance of 5 mils or less.

Embodiment No. 28 is the segmented pressware die set according to Embodiments 21 through 27, wherein the guide key surfaces and guide channel surfaces have a surface-to-surface clearance of 4 mils or less.

Embodiment No. 29 is the segmented pressware die set according to Embodiments 21 through 28, wherein each of the guide keys has a pair of opposed generally planar guide surfaces extending in a substantially radial direction from the central axis of the die set and each of the guide channels is U-shaped with a pair of opposed generally planar surfaces extending in a substantially radial direction from the central axis of the die set.

Embodiment No. 30 is the segmented pressware die set according to Embodiments 21 through 29, wherein the outer ring is spring-mounted to the die or punch.

Embodiment No. 31 is the segmented pressware die set according to Embodiments 21 through 30, wherein the outer ring is a pressure ring mounted to an inner member of the punch.

Embodiment No. 32 is the segmented pressware die set according to Embodiments 21 through 31, further comprising a draw ring mounted to an inner member of the die adapted to reciprocate independently of the inner member of the die over at least a portion of the forming stroke.

Embodiment No. 33 is the segmented pressware die set according to Embodiment 32, wherein there is provided a second plurality of guide keys mounted to an outer periphery of the inner member of the die, each of the second plurality of guide keys having a generally planar guide surface extending in a substantially radial direction from the central axis of the die set and wherein the draw ring is provided with a second plurality of guide channels, each of the second plurality of guide channels being provided with a generally planar guide channel surface extending in a substantially radial direction from the central axis of the die set, and wherein further the second plurality of guide keys and second plurality of guide channels are positioned, configured and dimensioned such that the generally planar guide key surfaces of the second plurality of guide keys cooperate with the generally planar guide channel surfaces of the second plurality of guide channels to limit rotation of the draw ring with respect to the inner member of the die.

Embodiment No. 34 is a segmented pressware die set for making pressware containers from a paperboard blank and advancing the containers along a machine direction, the die set being inclined with respect to horizontal along the machine direction, the die set comprising: (a) a die defining a shaping recess; (b) a punch defining a shaping surface, the punch and die being mounted for reciprocal motion with respect to each other along a central axis of the die set such that the shaping surface of the punch cooperates with the shaping recess of the die to shape a paperboard blank into a pressware container during a forming cycle as the die set reciprocates over a forming stroke; (c) at least one outer ring mounted to an inner member of the punch or die adapted to reciprocate independently of the inner member of the punch or die over at least a portion of the forming stroke; (d) a plurality of guide keys disposed between the outer ring and an inner member of at least one of the punch or die, each guide key having a generally planar guide key surface extending in a substantially radial direction with respect to the central axis of the die set; and (e) a plurality of guide channels adapted to receive the guide keys, each guide channel being provided with a generally planar guide channel surface extending in a substantially radial direction from the central axis of the die set, and wherein the guide keys and guide channels are positioned, configured and dimensioned such that the generally planar guide key surfaces cooperate with the generally planar guide channel surfaces to limit rotation of the outer ring with respect to the inner member of the punch or die, and wherein further the guide keys and guide channels are angularly offset with respect to the machine direction by at least 20° such that the guide surfaces are also load bearing surfaces.

Embodiment No. 35 is the segmented pressware die set according to Embodiment 34, wherein the guide keys and guide channels are angularly offset with respect to the machine direction by at least 30°.

Embodiment No. 36 is the segmented pressware die set according to Embodiments 34 or 35, wherein the die set is inclined at least 20° with respect to horizontal along the machine direction.

Embodiment No. 37 is the segmented pressware die set according to any of Embodiments 34, 35 or 36, wherein the die set is inclined at least 30° with respect to horizontal along the machine direction.

Embodiment No. 38 is the segmented pressware die set according to any of Embodiments 34, 35, 36 or 37, wherein the keys and guide channels are sequestered from a forming area between the punch and die.

Embodiment No. 39 is a segmented pressware die set for making pressware containers from a paperboard blank comprising: (a) a die defining a shaping recess; (b) a punch defining a shaping surface, the punch and die being mounted for reciprocal motion with respect to each other along a central axis of the die set such that the shaping surface of the punch cooperates with the shaping recess of the die to shape a paperboard blank into a pressware container during a forming cycle as the die set reciprocates over a forming stroke; (c) an outer pressure ring mounted to an inner member of the punch adapted to reciprocate independently of the punch over at least a portion of the forming stroke and having a plurality of guide channels on an inner periphery thereof, each guide channel being defined by a removable insert secured to the pressure ring and provided with a generally planar guide channel surface extending in a substantially radial direction from the central axis of the die set, (d) a plurality of guide keys mounted on a periphery an inner member of the punch, each guide key having a generally planar guide key surface extending in a substantially radial direction from the central axis of the die set; and wherein the guide keys and guide channels are positioned, configured and dimensioned such that the generally planar guide key surfaces cooperate with the generally planar guide channel surfaces to limit rotation of the outer pressure ring with respect to the inner member of the punch.

Embodiment No. 40 is the segmented pressware die set according to Embodiment 39, comprising at least 3 guide keys mounted on the inner member of the punch, each guide key having a generally planar guide key surface extending in a substantially radial direction from the central axis of the die set and at least 3 guide channels on the outer pressure ring, each of which guide channels is provided with a generally planar guide channel surface extending in a substantially radial direction from the central axis of the die set.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A segmented pressware die set for making pressware containers from a paperboard blank comprising:
    (a) a die defining a shaping recess;
    (b) a punch defining a shaping surface,
    the punch and die being mounted for reciprocal motion with respect to each other along a central axis of the die set such that the shaping surface of the punch cooperates with the shaping recess of the die to shape a paperboard blank into a pressware container during a forming cycle as the die set reciprocates over a forming stroke;
    (c) at least one outer ring mounted to an inner member of the punch or die adapted to reciprocate independently of the inner member of the punch or die over at least a portion of the forming stroke,
    (d) a plurality of guide keys mounted between an outer periphery of the inner member of the punch or die and an inner periphery of the outer ring, each guide key having a portion extending outwardly from the central axis of the die set; and
    wherein the guide keys are positioned, configured and dimensioned to limit rotation of the outer ring with respect to the inner member punch or die.

2. The segmented pressware die set according to claim 1, wherein the die set is a heated die set.

3. The segmented pressware die set according to claim 1, wherein the outer ring is spring-mounted to the die or punch.

4. The segmented pressware die set according to claim 1, wherein the outer ring is a pressure ring mounted to the punch.

5. The segmented pressware die set according to claim 4, wherein the punch has a segmented forming surface defined, in part, by the outer pressure ring.

6. The segmented pressware die set according to claim 5, further comprising a draw ring mounted to an inner member of the die adapted to reciprocate independently of the die over at least a portion of the forming stroke.

7. The segmented pressware die set according to claim 6, wherein there is provided a second plurality of guide keys mounted to a periphery of the die, each of the second plurality of guide keys extending outwardly from the central axis of the die set and wherein the second plurality of guide keys are positioned, configured and dimensioned to engage the draw ring in order to limit rotation of the draw ring with respect to the die.

8. The segmented pressware die set according to claim 1, disposed in an inclined position with respect to horizontal.

9. The segmented pressware die set according to claim 1, wherein the die set has from 3 to 10 guide keys.

10. The segmented pressware die set according to claim 1, wherein the die set is configured to form a container with a generally planar bottom portion, a transition portion which extends upwardly and outwardly and an outwardly extending brim portion.

11. A segmented pressware die set for making pressware containers from a paperboard blank comprising:
   (a) a die defining a shaping recess;
   (b) a punch defining a shaping surface,
the punch and die being mounted for reciprocal motion with respect to each other along a central axis of the die set such that the shaping surface of the punch cooperates with the shaping recess of the die to shape a paperboard blank into a pressware container during a forming cycle as the die set reciprocates over a forming stroke;
   (c) at least one outer ring mounted to an inner member of the punch or die adapted to reciprocate independently of the inner member of the punch or die over at least a portion of the forming stroke;
   (d) a plurality of guide keys disposed between the outer ring and an inner member of at least one of the punch or die, each guide key having a generally planar guide key surface extending in a substantially radial direction with respect to the central axis of the die set; and
   (e) a plurality of guide channels adapted to receive the guide keys, each guide channel being provided with a generally planar guide channel surface extending in a substantially radial direction from the central axis of the die set, and
wherein the guide keys and guide channels are positioned, configured and dimensioned such that the generally planar guide key surfaces cooperate with the generally planar guide channel surfaces to limit rotation of the outer ring with respect to the inner member of the punch or die.

12. The segmented pressware die set according to claim 11, comprising at least 3 guide keys, each guide key having a generally planar guide key surface extending in a substantially radial direction with respect to the central axis of the die set and at least 3 guide channels on the outer ring, each of which guide channels is provided with a generally planar guide channel surface extending in a substantially radial direction with respect to the central axis of the die set.

13. The segmented pressware die set according to claim 11, comprising at least 4 guide keys mounted on an inner member of at least one of the punch or die, each guide key having a generally planar guide key surface extending in a substantially radial direction from the central axis of the die set and at least 4 guide channels on the outer ring, each of which guide channels is provided with a generally planar guide channel surface extending in a substantially radial direction from the central axis of the die set.

14. The segmented pressware die set according to claim 13, wherein the guide keys are asymmetrically disposed around a periphery of the inner member of punch or die.

15. The segmented pressware die set according to claim 11, wherein the guide channels are defined by a plurality of removable inserts secured to the outer ring.

16. The segmented pressware die set according to claim 11, wherein the guide key surfaces and guide channel surfaces have a surface-to-surface clearance of 5 mils or less.

17. The segmented pressware die set according to claim 11, wherein the guide key surfaces and guide channel surfaces have a surface-to-surface clearance of 4 mils or less.

18. A segmented pressware die set for making pressware containers from a paperboard blank and advancing the containers along a machine direction, the die set being inclined with respect to horizontal along the machine direction, the die set comprising:
   (a) a die defining a shaping recess;
   (b) a punch defining a shaping surface,
the punch and die being mounted for reciprocal motion with respect to each other along a central axis of the die set such that the shaping surface of the punch cooperates with the shaping recess of the die to shape a paperboard blank into a pressware container during a forming cycle as the die set reciprocates over a forming stroke;
   (c) at least one outer ring mounted to an inner member of the punch or die adapted to reciprocate independently of the inner member of the punch or die over at least a portion of the forming stroke;
   (d) a plurality of guide keys disposed between the outer ring and an inner member of at least one of the punch or die, each guide key having a generally planar guide key surface extending in a substantially radial direction with respect to the central axis of the die set; and
   (e) a plurality of guide channels adapted to receive the guide keys, each guide channel being provided with a generally planar guide channel surface extending in a substantially radial direction from the central axis of the die set, and
wherein the guide keys and guide channels are positioned, configured and dimensioned such that the generally planar guide key surfaces cooperate with the generally planar guide channel surfaces to limit rotation of the outer ring with respect to the inner member of the punch or die, and wherein further the guide keys and guide channels are angularly offset with respect to the machine direction by at least 20° such that the guide surfaces are also load bearing surfaces.

19. The segmented pressware die set according to claim 18, wherein the guide keys and guide channels are angularly offset with respect to the machine direction by at least 30°.

20. The segmented pressware die set according to claim 18, wherein the keys and guide channels are sequestered from a forming area between the punch and die.

* * * * *